United States Patent
Kuras et al.

(10) Patent No.: US 10,843,575 B2
(45) Date of Patent: Nov. 24, 2020

(54) CONTROL SYSTEM FOR CONTROLLING OPERATION OF A DRIVE MOTOR

(71) Applicant: Caterpillar Inc., Peoria, IL (US)

(72) Inventors: Brian D. Kuras, East Peoria, IL (US); Sangameshwar Sonth, Dunlap, IL (US); Ankit Sharma, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 420 days.

(21) Appl. No.: 15/827,272

(22) Filed: Nov. 30, 2017

(65) Prior Publication Data

US 2019/0160965 A1    May 30, 2019

(51) Int. Cl.
  *B60L 15/20*    (2006.01)
  *E02F 9/20*    (2006.01)

(52) U.S. Cl.
  CPC ........... *B60L 15/2009* (2013.01); *B60L 15/20* (2013.01); *E02F 9/207* (2013.01); *B60L 2200/40* (2013.01); *B60L 2240/30* (2013.01); *B60L 2240/421* (2013.01); *B60L 2240/423* (2013.01); *B60L 2240/486* (2013.01); *B60L 2250/26* (2013.01); *B60L 2260/42* (2013.01)

(58) Field of Classification Search
  CPC .... B64C 13/503; B64C 13/505; G05D 1/0808
  USPC ...................................................... 701/3, 50
  See application file for complete search history.

(56) References Cited

U.S. PATENT DOCUMENTS

| | | | |
|---|---|---|---|
| 4,893,241 A * | 1/1990 | Girodat | A01D 41/1274 56/10.2 G |
| 6,607,253 B1 | 8/2003 | Yamamoto et al. | |
| 7,772,792 B2 * | 8/2010 | Kawaguchi | E02F 9/207 318/461 |
| 8,620,524 B2 | 12/2013 | Kobayashi et al. | |
| 9,018,870 B2 | 4/2015 | Kobayashi et al. | |
| 9,294,020 B2 | 3/2016 | Yamato et al. | |
| 9,315,114 B2 | 4/2016 | Oono et al. | |
| 9,365,215 B2 | 6/2016 | Ohmori et al. | |
| 2012/0101696 A1 * | 4/2012 | Udagawa | E02F 9/123 701/50 |
| 2016/0130786 A1 * | 5/2016 | Miyamoto | E02F 9/2079 701/50 |
| 2016/0375894 A1 | 12/2016 | Kawai et al. | |

* cited by examiner

*Primary Examiner* — Peter D Nolan
*Assistant Examiner* — Luat T Huynh

(57) ABSTRACT

A control system for controlling operation of a drive motor includes an input device for providing a command signal that is indicative of a desired speed and direction of rotation of the drive motor. A sensor is associated with the drive motor and adapted to provide a sensor signal indicative of current rotational speed of the drive motor. A controller receives the command signal, and determine whether the command signal is indicative of a desired zero speed to be associated with the drive motor. The controller also receives the sensor signal, and determine whether the current rotational speed of the drive motor is within a pre-defined range of difference from the desired zero speed. The controller then generates a de-rated torque command signal having a reduced gain factor, and reduce the current rotational speed of the drive motor based on the de-rated torque command signal.

14 Claims, 5 Drawing Sheets

CONTROL SYSTEM FOR CONTROLLING OPERATION OF A DRIVE MOTOR

TECHNICAL FIELD

The present disclosure relates generally to machines operated using a drive motor. More particularly, the present disclosure relates to a control system for controlling operation of a drive motor.

BACKGROUND

Machines such as dozers, excavators, wheel loaders and others use different types of drive mechanisms to propel the machine on a ground surface. Known drive mechanisms include use of electric motors, hydraulic motors, mechanical transmissions, and split torque transmissions for facilitating propulsion of the machine. The type of drive mechanism used for each application may also dictate, in a fashion that is consistent for various machine types, the behavior of the machine. Electric and hydraulic drive systems, for example, may tend to drift when reaching a desired stop position.

Based on the substantial similarity in the way machines operate depending on the type of drive that is used, experienced operators may have developed skills within the framework of their expectations about how a machine will behave during operation. However, as can be appreciated, changes in the way a machine behaves during operation may not only decrease the productivity of an experienced operator, but may also pose other considerations in that the various machine portions may not move exactly in a way that their operator expects them to.

Such issues of machine behavior during operation may become especially pronounced when the drive systems are upgraded or otherwise redesigned, for example, when redesigning machine systems to improve their efficiency and to reduce overall machine fuel consumption. One example of a machine redesign along these lines is the conversion of a drive system from a hydraulic drive system to an electric or hybrid-electric drive system. It has been noted, for example, by operators testing an electrically-driven mechanism in dozers that the deceleration of the dozer is inconsistent and sluggish when approaching zero speed or rest. Such inconsistent and sluggish deceleration may sometimes cause the dozer's final rest position to have gone further than the operator's expectations which is sometimes referred to as "machine drift."

This issue has been recognized and at least one solution has been proposed in the past to address the different machine behavior when changing from a hydraulic to an electric drive system. An example of a control system for an electric swing motor that attempts to mimic machine operation with a hydraulic swing motor can be seen in U.S. Pat. No. 7,772,792 (hereinafter referred to as "the '792 patent"), which was granted to Kawaguchi et al. on Aug. 10, 2010. The '792 patent describes a rotation control device for the rotary body of an excavator. The control device provides a small first torque command when rotating the rotary body, but can also provide a second, larger torque command when an acceleration is commanded. More specifically, in one embodiment of the '792 patent, a control system is described that includes numerous tables, which are populated with acceleration values that are determined based on a velocity command. The various tables are dedicated to emulating various effects of hydraulic and mechanical systems of the excavator, such as hydraulic fluid pressure, rotating inertia of the rotary body depending on the position and loading of the bucket, and others. In this way, the rotation control device described in the '792 patent attempts to emulate the operation of a hydraulic system by use of the electric system by, for example, providing a slight deceleration when the rotary body is rotating to emulate the operation of a hydraulically motivated actuator when fluid is diverted from the swing actuator to actuate the boom and/or bucket actuators.

Even though the devices described in the '792 patent are at least partially effective in emulating the behavior of a hydraulically activated swing mechanism with an electric motor, the extensive tabulation of data is labor intensive and may not automatically adapt to different operating conditions and loads. Moreover, these operating conditions and loads as experienced by the drive systems that are configured for swing control differ from that typically experienced by drive systems that are configured for propelling machines on a ground surface.

SUMMARY

In an aspect of the present disclosure, a control system for controlling operation of a drive motor is disclosed. The control system includes an input device that is configured to receive a command signal from a user, the command signal being indicative of a desired speed and direction of rotation of the drive motor. The control system further includes a sensor that is associated with the drive motor. The sensor is adapted to provide a sensor signal that is indicative of current rotational speed associated with the drive motor. The control system also includes a controller that is disposed in independent communication with the input device, the sensor, and the drive motor respectively. The controller is configured to receive the command signal from the input device, and determine whether the command signal is indicative of a desired zero speed to be associated with the electric motor. Further, the controller is also configured to receive the sensor signal from the sensor, and determine from the sensor signal whether the current rotational speed of the motor is within a pre-defined range of the desired zero speed. The controller is configured to monitor the output speed of the drive motor, and if the output speed of the motor is not zero, then the controller is further configured to generate a de-rated torque command signal having a reduced gain factor, and reduce the current rotational speed response of the drive motor based on the de-rated torque command signal.

In another aspect of the present disclosure, a method for controlling operation of a drive motor includes providing a command signal from a user, the command signal being indicative of a desired speed and direction of rotation of the drive motor. The method also includes generating a sensor signal that is indicative of current rotational speed associated with the drive motor. The method further includes receiving the command signal from the input device by means of a controller, and determining whether the command signal is indicative of a desired zero speed to be associated with the electric motor. The method also includes receiving the sensor signal from the sensor by means of the controller, and determining from the sensor signal whether the current rotational speed of the motor is within a pre-defined range of the desired zero speed. The method further includes monitoring the output speed of the drive motor, and if the output speed of the motor is not zero, then the method includes generating a de-rated torque command signal having a reduced gain factor, and reducing the current rotational speed response of the drive motor based on the de-rated torque command signal.

In yet another aspect, embodiments of the present disclosure have also been directed to a machine that includes a drive motor to rotatively drive a load while employing the control system disclosed herein for controlling an operation of the drive motor.

DETAILED DESCRIPTION

This disclosure relates to a machine that is configured to operate using drive motors. However, it should be understood that the disclosure could also be applicable for a machine that is operated by a hydrostatic configuration or a drive system that incorporates a split torque arrangement that includes both a mechanical transmission and a hydraulic variable input. In one aspect, the system and method disclosed herein are applicable to not only newly manufactured machines, but also to machines that are reconditioned, refurbished and/or retrofitted with electric drive systems.

Figure 1:
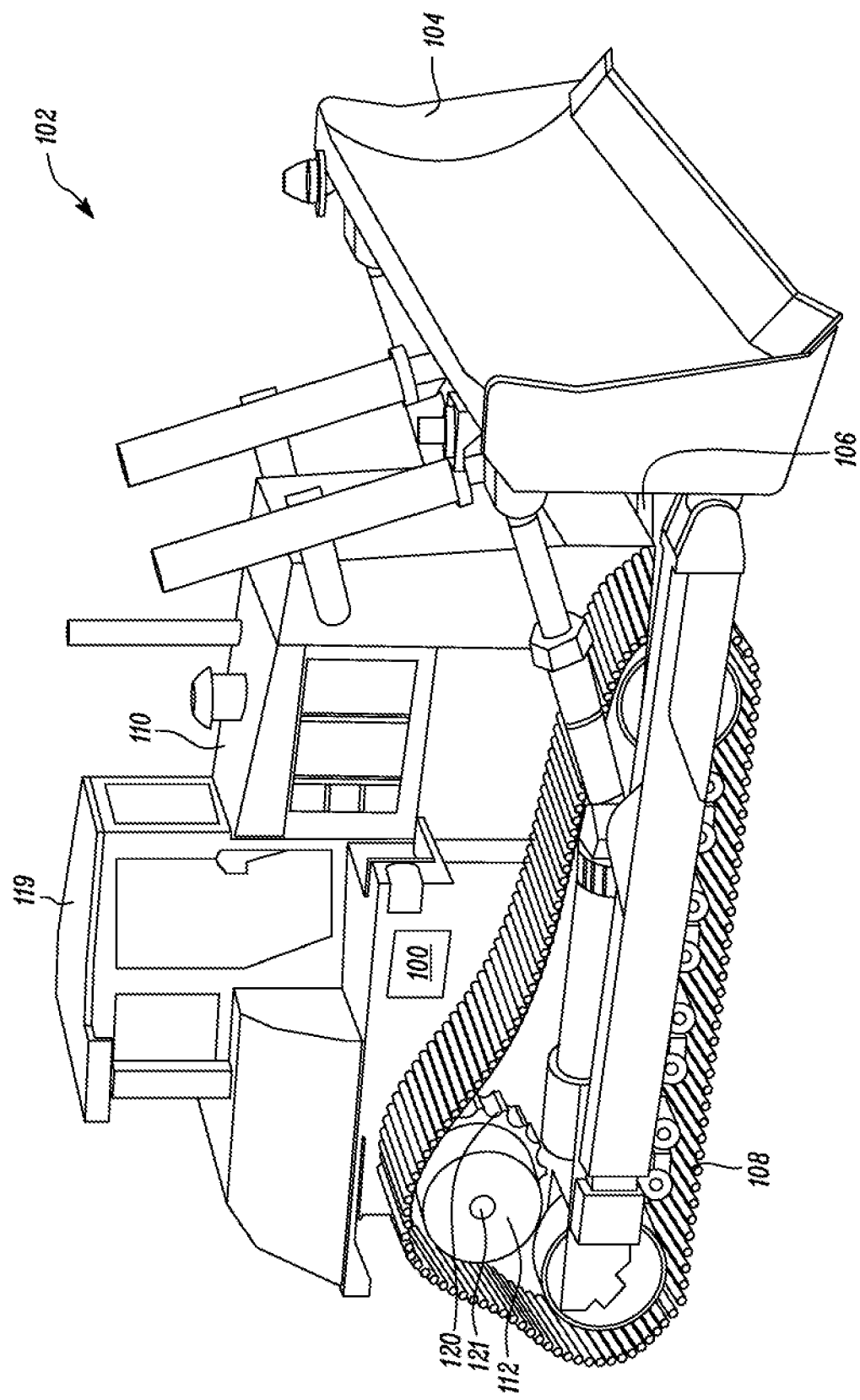
FIG. 1 is a perspective view of a dozer, in accordance with an exemplary embodiment of the present disclosure.

Referring to FIG. 1, a machine 102 is shown as being exemplarily embodied as a dozer. Although the machine 102 depicted in the illustrated embodiment of FIG. 1 is embodied as a dozer, in other embodiments, the machine 102 may embody any other type of mobile machine that is configured to perform operations associated with industries related to mining, construction, farming, or any other industry known in the art. As shown in FIG. 1, the machine 102 includes a frame 106 and a pair of ground engaging members 108 rotatably supported on the frame 106 of which only one ground engaging member 108 is visible in the perspective view of the machine 102 depicted in FIG. 1. As shown in the illustrated embodiment of FIG. 1, the ground engaging members 108 are embodied as tracks, but in other machines, the ground engaging members 108 may be wheels in place of the tracks disclosed herein. These ground engaging members 108 may be driven by drive power output by a prime mover 110. The prime mover 110 may include, but is not limited to, an engine, a battery, an electric motor, or any other type of prime mover known to persons skilled in the art for propelling the machine 102 on a ground surface.

The machine 102 also includes a work implement 104. The work implement 104 shown in the illustrated embodiment of FIG. 1 is embodied in the form of an earth digging and carrying blade. Although the blade is illustrated as the attached implement of the illustrated dozer, any implement may be utilized and employed for a variety of tasks, including, for example, loading, compacting, lifting, brushing, and include, for example, buckets, compactors, forked lifting devices, brushes, grapples, cutters, shears, breakers/hammers, augers, and others.

Figure 2:
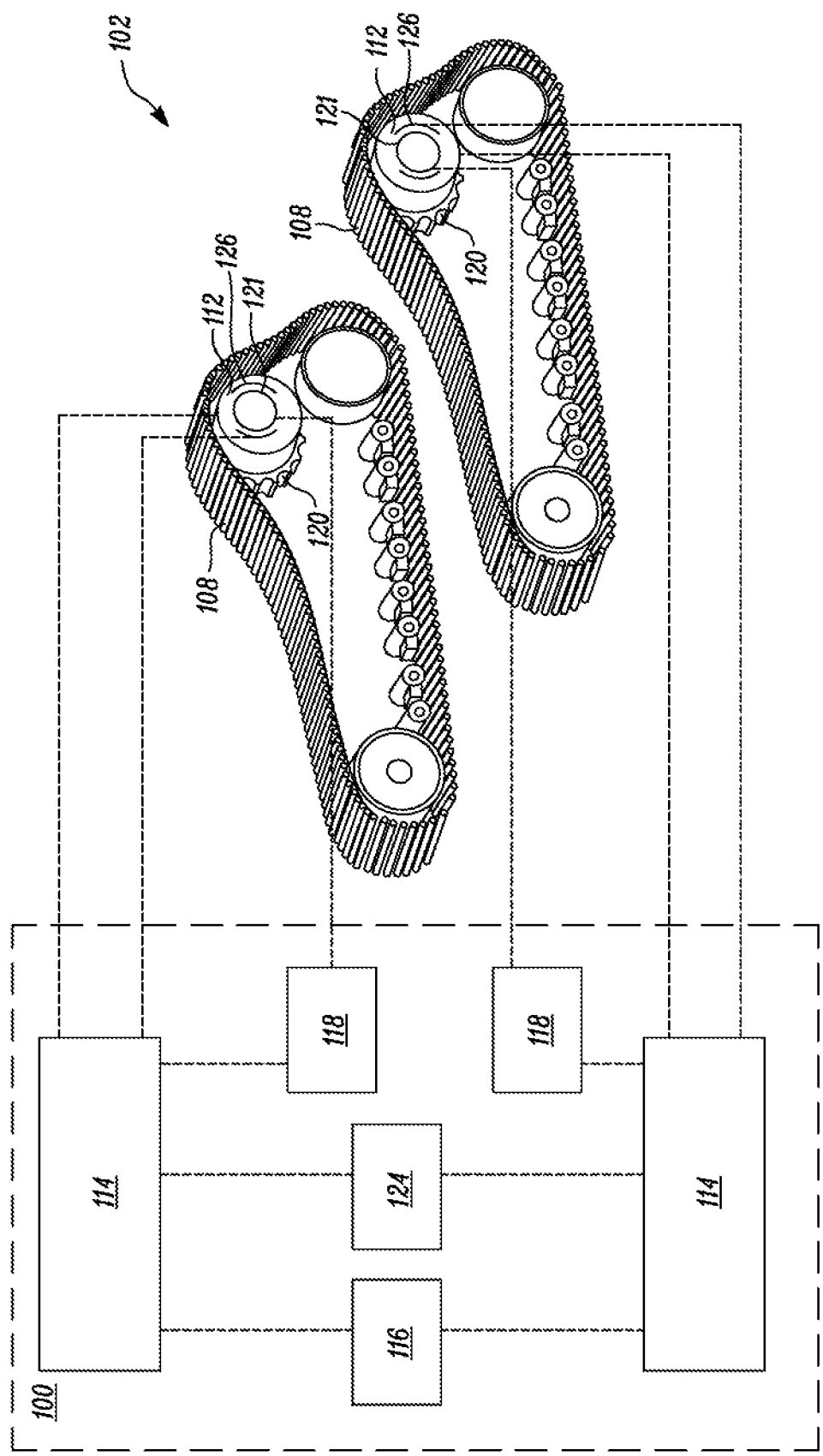
FIG. 2 is a partially fragmented of the dozer showing a control system for controlling operation of drive motors associated with the dozer, in accordance with an exemplary embodiment of the present disclosure.

As shown in FIG. 2, a pair of drive motors 112 are disposed on the machine 102. As will be described the drive motors 112 are electric drive motors but it should be understood that the drive motors 112 could be hydraulic drive motors as set forth earlier. Each drive motor 112 is independently operable to cause rotation of an associated ground engaging member 108 relative to the frame 106 of the machine 102. However, in other configurations, these drive motors 112 could be connected through a mechanical gearing arrangement such as a transmission as well.

Further, a control system 100 is associated with the drive motors 112. As shown in the illustrated embodiment of FIG. 2, the control system 100 includes a pair of controllers 114 that are configured to independently control operation of drive motors 112 based on commands being issued at an input device 116 and a brake input device 124 e.g., a brake lever that are coupled with the pair of the controllers 114. For the sake of simplicity, the present disclosure will be explained in reference to one of the two controllers 114 that are depicted in FIG. 2. However, it should be noted that the system 100 may only have one controller 114 without limiting the scope of this disclosure.

Each of the input device 116 and the brake input device 124 disclosed herein may be embodied as a control lever, a joystick, a pedal, a push button, a momentary switch, or any other type of control implement known to persons skilled in the art for performing functions consistent with the present disclosure. In an embodiment of this disclosure, the input device 116 may be located preferably within a cab 119 of the machine 102 that is shown in FIG. 1 and operated by a user i.e., an operator of the machine 102. In alternative embodiments, the input device 116 may be located remotely from the machine 102, for example, at an operator station located remotely with respect to the machine 102. The input device 116 may be operated by the user to provide a command signal that is indicative of a desired speed and direction of the machine 102 and subsequently the speed and direction of rotation of the drive motor 112.

As shown in FIG. 2, the control system 100 further includes a sensor 118 that is associated with the drive motor 112. The sensor 118 is adapted to provide a sensor signal to the controller 114. The sensor signal disclosed herein is indicative of current rotational speed and direction of rotation associated with the drive motor 112. In one embodiment, the sensor 118 disclosed herein may be a position sensor that is configured to provide a signal, to the controller 114, indicative of a rotational position of the drive motor 112 relative to the frame 102. In an additional embodiment, the position sensor may be an encoder associated with the ground engaging member 108 and configured to measure its relative angular displacement relative to the frame 106 of the machine 102. In the illustrated embodiment, the sensor may be a speed sensor that is configured to measure relative displacement of an output shaft 121 of the drive motor 112 that drives a sprocket 120 disposed in mesh with the ground engaging member 108 (refer to FIGS. 1 and 2) as an indication of the relative angular speed and direction of rotation of the ground engaging member 108 relative to the frame 106.

Moreover, as shown, the controller 114 is disposed in independent communication with the input device 116, the sensor 118, and the drive motor 112 respectively. The controller 114 is configured to receive the command signal from the input device 116. Upon receiving the command signal from the input device 116, the controller 114 is configured to determine whether the command signal is indicative of a desired zero speed to be associated with the drive motor 112. Further, the controller 114 is also configured to receive the sensor signal from the sensor 118, and determine from the sensor signal whether the current rotational speed of the drive motor 112 is within a pre-defined range of difference from the desired zero speed. If so, the controller 114 is further configured to generate a de-rated torque command signal having a reduced gain factor, and reduce the current rotational speed of the drive motor 112 based on the de-rated torque command signal.

Figure 3:
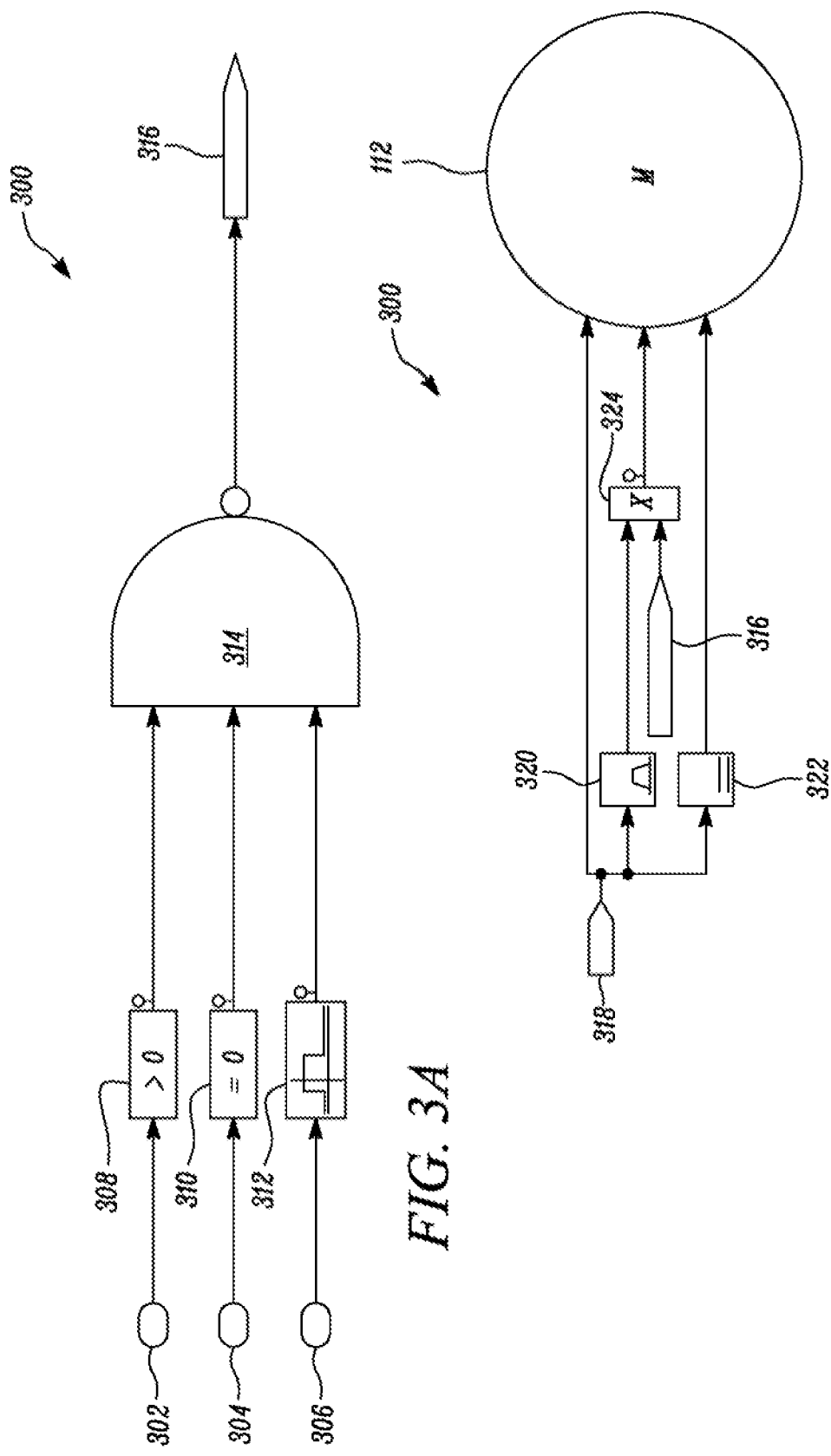
FIG. 3A is a portion of an exemplary schematic illustration of system architecture associated with a controller of the control system for the exemplary machine, in accordance with one embodiment of the present disclosure.
FIG. 3B is a portion of an exemplary schematic illustration of system architecture associated with a controller of the control system for the exemplary machine, in accordance with one embodiment of the present disclosure.

Referring to FIGS. 3A and 3B, an example of a system architecture 300 that may be embody the controller 114 of FIG. 2 according to one embodiment of the present disclosure is depicted. In this embodiment, the system architecture 300 may include a brake status module 302 that is configured to determine whether a brake 126 (FIG. 2) associated with the machine 102 is engaged with the output shaft 121 of the drive motor 112. The system architecture 300 also includes a desired speed indicator module 304 that is configured to determine whether a desired zero speed command has been issued at the input device 116. Further, the system architecture 300 also includes a current speed indicator module 306 that is configured to determine whether a current speed of the drive motor 112 is close to zero or is within a pre-determined near zero speed, for example, the actual speed of the drive motor 112 is within 100 revolutions per minute near zero speed.

The system architecture 300 also includes three comparators 308, 310, and 312 that are in communication with respective ones of the brake status module 302, the desired speed indicator module 304, and the current speed indicator module 306. If the brake status module 302 determines that the brakes 126 are engaged with the output shaft 121 of the drive motor 112, then the comparator 308 provides an indication, for example, by outputting a value of '1' to denote the brake status as being engaged. If the desired speed indicator module 304 determines that a zero-speed command has been issued at the input device 116, then the comparator 310 provides an indication, for example, by outputting a value of '1' to denote that the speed command issued at the input device 116 is indicative of a zero-desired speed at the drive motor 112. Similarly, if the current speed indicator module 306 determines that the current speed of the drive motor 112 is close to zero or within the pre-determined near zero speed, for example, the actual speed of the drive motor 112 is within 100 revolutions per minute near zero speed, then the comparator 312 provides an indication, for example, by outputting a value of '1' to denote that the current speed of the drive motor 112 is close to zero or within the pre-determined near zero speed.

A NAND gate 314 may receive the indications from each of the comparators 308, 310, and 312 and provide an indication 316 that a de-rated torque command signal is needed. For example, when a value '1' is output as an indication from each of the comparators 308, 310, and 312 corresponding to conditions being satisfied at respective ones of the comparators 308, 310, and 312, the NAND gate 314 is configured to output a '0' value that is indicative of the de-rated torque command signal being needed to reduce the response and improve stability of the drive motor 112 as the brake 126 will effectively hold the output shaft 121 of the drive motor 112 at the desired speed of zero.

As can be appreciated, the de-rated torque command signal disclosed herein is rendered with a reduced gain factor which is explained later herein. Referring to FIG. 3B, a portion of the system architecture 300 comprising a target deceleration module 318, a proportional gain module 320, and an integral gain module 322 is depicted. The target deceleration module 318 may be disposed in communication with the current speed indicator module 306 shown in FIG. 3a and with the drive motor 112 as shown in FIG. 3B. Moreover, the target deceleration module 318 may be disposed in communication with each of the proportional gain module 320 and the integral gain module 322 respectively. Also, as shown in FIG. 3B, the proportional gain module 320 is disposed in communication with a multiplier 324 to which the indication 316 from the NAND gate 314 would be provided. Based on the indication 316, and an input from the target deceleration module 318 via the proportional gain module 320, a torque request signal having a de-rated torque command signal therein i.e., a torque command signal with the reduced gain factor may be generated at the multiplier 324 and provided to the drive motor 112 to which the current response of the drive motor 112 is reduced based on the de-rated torque command signal while the drive motor 112 gains improved stability.

In the foregoing embodiment of FIGS. 3A and 3B, although the brake status module 302 and its corresponding comparator 308 are disclosed as forming part of the system architecture 300, it is envisioned that in an alternative configuration of the controller's system architecture 300, the brake status module 302 and its corresponding comparator 308 may be omitted i.e., the controller 114 may be configured to merely include the desired speed indicator module 304 the current speed indicator module 306, and their associated comparators 310 and 312 respectively. For operation of such a configuration of the controller 114, if the value '1' is output as an indication from each of the comparators 310 and 312, the NAND gate 314 is configured to output the indication 316 e.g., a '0' value that is indicative of the de-rated torque command signal being needed to reduce the response and improve stability of the drive motor 112. Therefore, it may be noted that inclusion or exclusion of the brake status module 302 and its corresponding comparator 308 is merely exemplary in nature and non-limiting of this disclosure.

Figure 4:
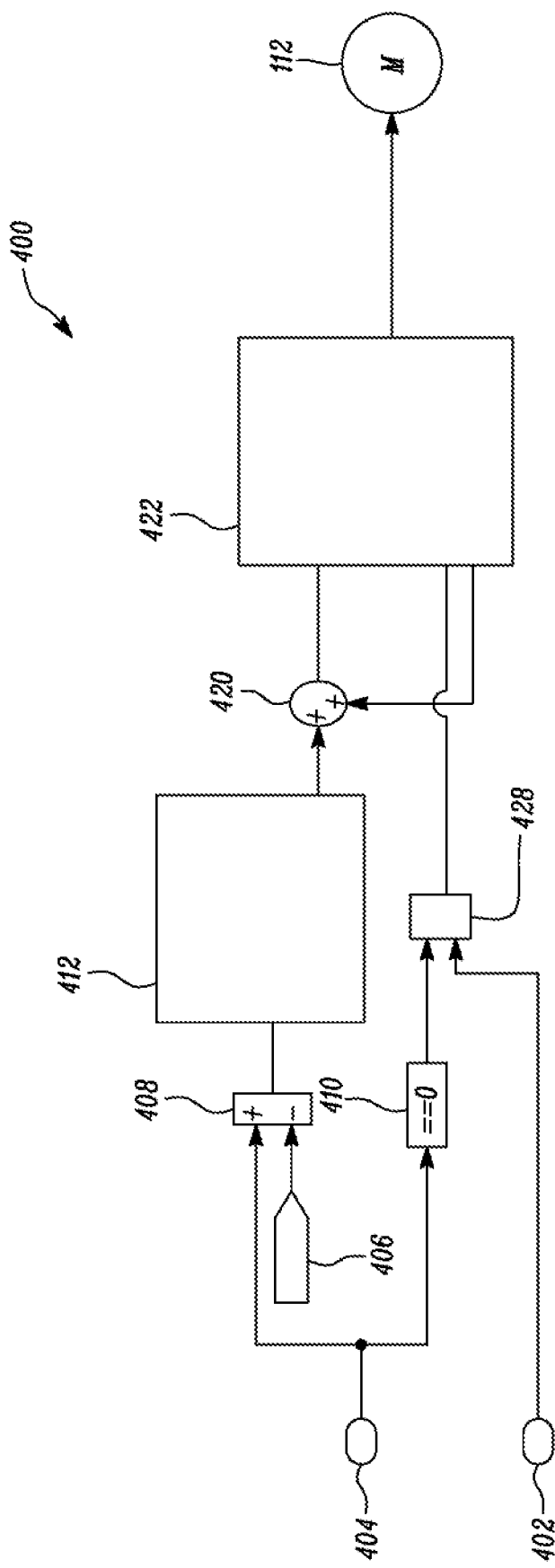
FIG. 4 is an exemplary schematic illustration of system architecture associated with the controller of the exemplary machine, in accordance with another embodiment of the present disclosure.

FIG. 4 illustrates another example of a system architecture 400 that may embody the controller 114 of FIG. 2 according to another embodiment of the present disclosure. In this embodiment, the system architecture 400 may include a desired speed indicator module 404 and a current speed indicator module 406. Additionally, or optionally, as shown in the illustrated embodiment of FIG. 4, the system architecture 400 may include a brake status module 402. Outputs from the desired speed indicator module 404 and the current speed indicator module 406 may be compared at a first comparator 408 to determine a difference between a desired speed command signal provided by the input device 116 (FIG. 2) and a current rotational speed of the drive motor 112 that is provided by the sensor 118 (FIG. 2). The first comparator 408 may be configured to determine the aforesaid difference at spaced-apart intervals of time, a pre-specified frequency, or continually depending on specific requirements of an application. The comparator 408 sends the speed error or difference to a module 412 that determines if the speed error or difference is changing sign, or to say in another way, the module 412 determines if the drive motor 112 is oscillating and if so, the module 412 begins to count the number of oscillations. Next, the module 412 communicates to the amount of oscillations to another module 422. As determined via module 428, when the speed command remains zero as measured by module 410 or when the brakes 126 are engaged via broke status module 402, the module 422 reduces or changes the response of the drive motor 112 which results in a de-rated or changed torque. The module 422 continues to reduce or change the response of the drive motor 112 until the oscillation, identified by module 412, ceases to exist i.e., oscillation ended.

Figure 5:
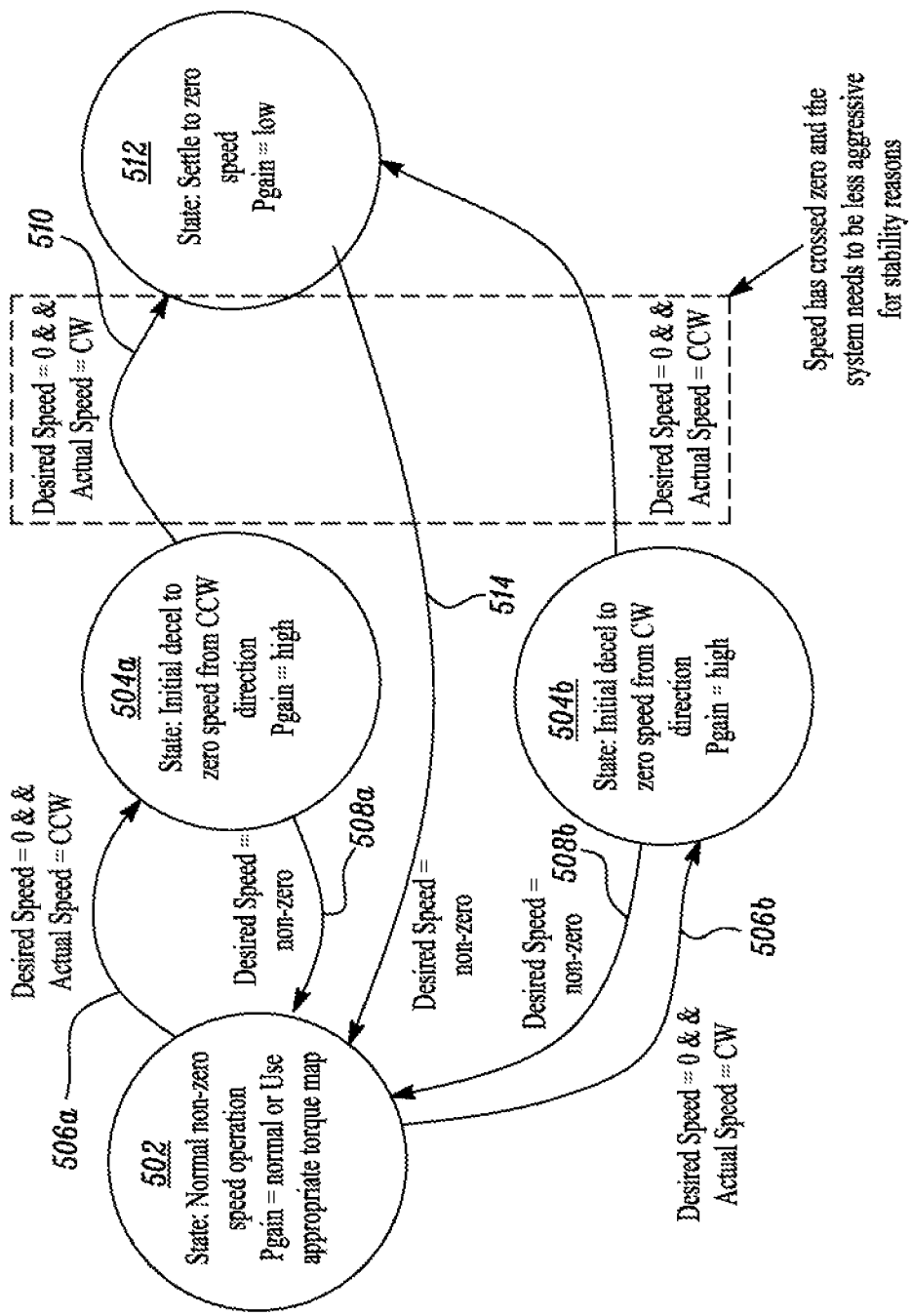
FIG. 5 is a state-flow diagram for a drive control, in accordance with an embodiment of the present disclosure.

To better illustrate the control in the operation of the drive motor 112 under various operating states, a state-flow diagram for a method of controlling operation of the drive motor 112 is shown in FIG. 5. At a first or normal operating state 502, the input device 116 controlling the movement of the ground engaging members 108 is at a non-zero position, which means that the operator of the machine desires rotation of at least one of the drive motors 112 and its associated ground engaging member 108 in one direction or the other. For sake of simplicity, the rotation of the drive motor 112 will be described as being in a clockwise (CW) direction or a counter-clockwise (CCW) direction. During the normal operating state 502, the drive motor 112 is rotating in the CW or CCW direction at an angular speed. The angular speed of the drive motor 112 under this operating state may be substantially constant or variable, based on the operator's handling of the input device 116. The torque commanded to initiate or maintain rotation of the drive motor 112 may be provided from a traditional closed loop PID controller or a lookup table and controlled by its associated controller 114 using a first or normal operating state set of gains.

The normal operating state 502 is active while the input device 116, for example, an operator input lever is at a non-zero position indicating that the operator is commanding a rotational motion of the drive motor 112. When the input device 116 is placed at the zero position, an initial deceleration or stopping operating state 504 i.e., one of the stopping operating states 504a or 504b is activated. With reference to FIG. 5, a transition 506 between the normal operating state 502 to the stopping operating state 504 occurs when the input device 116 is positioned into its neutral or zero position while the drive motor 112 is still executing a rotation of its associated output shaft 121. At the stopping operating state 504a or 504b, an aggressive and nearly constant aggressive torque tending to brake or stop the rotation of the drive motor 112 is applied. In this manner, a rotation of the drive motor 112 in the CW direction would be counter-acted by a braking torque applied in the CCW direction, and vice-versa.

The magnitude of the braking torque applied when braking the rotation of the drive motor 112 may be determined by use of a relatively aggressive torque lookup table, which determines braking torque based on the current speed magnitude of the drive motor 112, as previously described or alternatively, the aggressive torque could be determined by aggressive PID gains in a traditional closed loop PID controller. The braking torque is applied while the input device 116 is maintained at the zero position, which indicates that the operator still expects the drive motor 112 to stop rotating. In the event that, during the stopping operating state 504 and before the speed of the drive motor 112 reaches zero, the input device 116 is moved from the zero position, a transition 508a or 508b switches back the drive motor 112 to the normal operating state 502.

The stopping operating state 504a or 504b is maintained until the speed of the drive motor 112 reaches zero. Because of the rotational inertia of the machine 102 vis-à-vis the ground engaging members 108 and, in general, due to general overall system delays, even with the application of a zero-torque request when speed reaches zero, the speed of the drive motor 112 will cross zero speed and begin tending to rotate in the opposite (and undesired) direction. In other words, if operating in the CW direction, the drive motor 112 will stop and begin to slightly rotate in the CCW direction. When the rotation of the drive motor 112 changes direction, and while the input device 116 is maintained at its zero position, a transition 510 will occur to a third or settling to zero speed operating state 512. In the illustrated embodiment, the third or settling to zero speed operating state 512 is shown as being separate from the normal operating state 502 for purpose of illustration but the two states may be integrated into a single operating state.

During operation in the settling to zero speed operating state 512, the controller 114 provides less aggressive but appropriate de-rated torque command signals to the drive motor 112 such that the associated ground engaging member 108 settles to a zero speed in a smooth and non-aggressive manner. Torque response during the settling to zero speed operating state 512 can be less aggressive due to the de-rated torque command signals when compared to the torque response in the stopping operating state 504 and the normal operating state 502. In one embodiment, for example, torque control at the stopping state 504 may emphasize the proportional component by having an aggressive proportional gain of a PID controller, while torque control at the settling to zero speed operating state 512 may de-emphasize the proportional component. Once speed has settled at zero, the controller 114 may remain in the settling to zero speed operating state 512 until the input device 116 is moved away from its zero or neutral position to command rotation of the drive motor 112. At that time, a transition 514 may switch operation back to the normal operating state 502 so that the appropriate direction of rotation i.e., CW or CCW direction may be executed by the drive motor 112 depending on a type of input provided by the user at the input device 116. The switching between the normal, braking and settling to zero speed operating states 502, 504 and 512 may repeat each time an operator commands rotation of the drive motor 112.

INDUSTRIAL APPLICABILITY

The present disclosure is applicable to machines having drive motors, particularly, of the electrically operated type, and in other cases, to machines that are typically operated by use of a hydrostatic configuration or a drive system that incorporates a split torque arrangement including both a mechanical transmission and a hydraulic variable input. In the past, certain applications that extensively used such drive systems, especially for propelling the machine, such as dozers, on a ground surface included hydraulically operated drive mechanisms. In a typical hydraulically powered drive mechanism, a hydraulic pump provided pressurized fluid to a hydraulic motor to effect rotation of the ground engaging members. When stopping rotation of the ground engaging members with a hydraulically powered drive, the rotational momentum of the ground engaging members, at least in part, due to the load associated with the machine, would be dissipated with the use of one or more relief valves that typically circulate fluid around a closed loop that includes the hydraulic motor. Such relief valves are configured to maintain a pressure at the outlet of the hydraulic motor, which provides a braking torque that aids to stop the rotation of the hydraulic motor, and hence, the ground engaging member. When converting to an electrically operated drive mechanism, however, a drift was noticed as the controller associated with the drive motor settled to zero speed when braking the rotation of the drive motor.

The functionality and system behavior that emulates a hydraulically operated drive mechanism with an electric drive motor is desirable for various reasons such as the avoidance for the need to re-train operators. To effectively provide the braking torque that is desired when the rotation of the drive motor has stopped, while still providing fine torque control during a rotating state of the drive motor, the disclosed systems and methods use an operating state-based control scheme. In a first state of operation, fine torque control can be provided by the controller during the rotation of the drive motor. When a zero speed is desired, in one embodiment, the controller's gains are made aggressive to provide a more proportional-term-driven response in a second state of operation. Stated differently, control is taken away from the fine-control schema of the controller to provide sufficient braking torque. When most of the momentum associated with the machine has been absorbed vis-à-vis the ground engaging members, fine control is once again provided in a third state of operation to help the drive motors and hence, the associated ground engaging members settle to a zero speed.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A control system for controlling operation of a drive motor, the control system comprising:
   an input device configured to receive a command signal from a user, the command signal being indicative of a desired speed and direction of rotation of the drive motor;
   a sensor associated with the drive motor and adapted to provide a sensor signal indicative of current rotational speed associated with the drive motor;
   a controller disposed in communication with each of the input device, the sensor, and the drive motor, the controller configured to:
      receive the command signal from the input device;
      determine from the input device whether the command signal is indicative of a desired zero speed to be associated with the drive motor;
      receive the sensor signal from the sensor;
      determine from the sensor signal whether the current rotational speed of the motor is within a pre-defined range of the desired zero speed;
      monitor the output speed of the drive motor, and if the output speed of the motor is not zero, generate a de-rated torque command signal having a reduced gain factor, wherein the de-rated torque command signal is generated in one of: a service brake is applied and the output speed of the drive motor is not zero, and no service brake is applied and the output speed of the drive motor is oscillating between a plus and minus direction; and
      reduce the current rotational response of the drive motor based on the de-rated torque command signal.

2. The control system of claim 1, wherein the de-rated torque command signal is generated only with the service brake applied when the output speed of the drive motor is within the pre-defined range of the desired zero speed.

3. The control system of claim 1, wherein generating the de-rated torque command signal includes:
   providing the desired zero speed command signal as a setpoint to the controller;
   providing the sensor signal as feedback to the controller;
   operating the controller using discrete values of reduced gains based on the sensor signal relative to the desired zero speed command signal; and
   generating the de-rated torque command signal as an output of the controller.

4. The control system of claim 1, wherein the controller is configured to provide the de-rated torque command signal to the drive motor in a settling operating state until the current rotational speed of the drive motor reaches the desired zero speed.

5. The control system of claim 1, wherein the sensor signal is one of a position signal, a speed signal, and an acceleration signal, each of which is indicative of rotational motion between the drive motor and a load connected to the drive motor via a gearing arrangement.

6. A machine comprising:
   a drive motor configured to rotatively drive a load;
   an input device configured to receive a command signal from a user, the command signal being indicative of a desired speed and direction of rotation of the drive motor;
   a sensor associated with the drive motor and adapted to provide a sensor signal indicative of current rotational speed and direction of rotation associated with the drive motor;
   a controller disposed in communication with each of the input device, the sensor, and the drive motor, the controller configured to:
      receive the command signal from the input device;
      determine from the input device whether the command signal is indicative of a desired zero speed to be associated with the electric motor;
      receive the sensor signal from the sensor;
      determine from the sensor signal whether the current rotational speed of the motor is within a pre-defined range of the desired zero speed;
      monitor the output speed of the drive motor, and if the output speed of the motor is not zero, generate a de-rated torque command signal having a reduced gain factor, wherein the de-rated torque command signal is generated in one of: a service brake is applied and the output speed of the drive motor is not zero, and no service brake is applied and the output speed of the drive motor is oscillating between a plus and minus direction; and
      reduce the current rotational response of the drive motor based on the de-rated torque command signal.

7. The machine of claim 6, wherein the de-rated torque command signal is generated only with the service brake applied when the output speed of the drive motor is within the pre-defined range of the desired zero speed.

8. The machine of claim 6, wherein generating the de-rated torque command signal includes:
providing the desired zero speed command signal as a setpoint to the controller;
providing the sensor signal as feedback to the controller;
operating the controller using discrete values of reduced gains based on the sensor signal relative to the desired zero speed command signal; and
generating the de-rated torque command signal as an output of the controller.

9. The machine of claim 6, wherein the controller is configured to provide the de-rated torque command signal to the drive motor in a settling operating state until the current rotational speed of the drive motor reaches the desired zero speed.

10. The machine of claim 6, wherein the sensor signal is one of a position signal, a speed signal, and an acceleration signal, each of which is indicative of rotational motion between the drive motor and the load that is connected to the drive motor via a gearing arrangement.

11. A method for controlling operation of a drive motor, the method comprising:
providing, by means of an input device, a command signal from a user, the command signal being indicative of a desired speed and direction of rotation of the drive motor;
generating, by means of a sensor associated with the drive motor, a sensor signal indicative of current rotational speed associated with the drive motor;
receiving, by means of a controller, the command signal from the input device,
determining, by means of the controller, whether the command signal is indicative of a desired zero speed to be associated with the drive motor,
receiving, by means of the controller, the sensor signal from the sensor,
determining from the sensor signal, by means of the controller, whether the current rotational speed of the drive motor is within a pre-defined range from the desired zero speed,
monitoring, by means of the controller, the output speed of the drive motor, and if the output speed of the motor is not zero, generating, by means of the controller, a de-rated torque command signal having a reduced gain factor,
generating the de-rated torque command signal in one of: a service brake is applied and the output speed of the drive motor is not zero, and no service brake is applied and the output speed of the drive motor is oscillating between a plus and minus direction, and
reducing, by means of the controller, the current rotational response of the drive motor based on the de-rated torque command signal.

12. The method of claim 11, wherein the de-rated torque command signal is generated only with the service brake applied when the output speed of the drive motor is within the pre-defined range of the desired zero speed.

13. The method of claim 11, wherein generating the de-rated torque command signal includes:
providing the desired zero speed command signal as a setpoint to the controller;
providing the sensor signal as feedback to the controller;
operating the controller using discrete values of reduced gains based on the sensor signal relative to the desired zero speed command signal; and
generating the de-rated torque command signal as an output of the controller.

14. The method of claim 11 further comprising providing, by means of the controller, the de-rated torque command signal to the drive motor in a settling operating state until the current rotational speed of the drive motor reaches the desired zero speed.

* * * * *